United States Patent [19]
Noda et al.

[11] 3,912,736
[45] Oct. 14, 1975

[54] PYRIDO[2,3-D] PYRIMIDINE-THIONES

[75] Inventors: Kanji Noda, Chikushino; Akira Nakagawa, Tosu; Toshiharu Motomura, Tosu; Kenji Yamagata, Tosu; Shunzo Yamasaki; Hiroyuki Ide, both of Fukuoka, all of Japan

[73] Assignee: Hisamitsu Pharmaceutical Co., Inc., Tosu, Japan

[22] Filed: Oct. 17, 1974

[21] Appl. No.: 515,678

[30] Foreign Application Priority Data
Oct. 25, 1973  Japan.............................. 48-120981

[52] U.S. Cl............................ 260/256.5 R; 424/251
[51] Int. Cl.² ....................................... C07D 239/00
[58] Field of Search ................................ 260/256.5

[56] References Cited
UNITED STATES PATENTS
3,272,816  9/1966  Papesch........................... 260/256.4

Primary Examiner—Leonard Schenkman
Attorney, Agent, or Firm—Browdy and Neimark

[57] ABSTRACT

The pyrido[2,3-d]pyrimidinethiones of the present invention can be represented by the following formula:

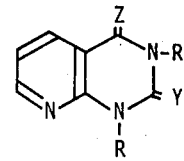

wherein R is selected from the group consisting of phenyl, substituted phenyl and aralkyl; $R^1$ is selected from the group consisting of hydrogen, lower alkyl, unsaturated lower alkyl, substituted lower alkyl and aralkyl; Y and Z are selected from the group consisting of O and S, but Y and Z are always dissimilar. The compounds of the present invention possess a high degree of pharmacological activities such as anti-inflammatory, anti-ulcerative, analgetic, antipyretic, antihistaminic and central nervous system depressive activities, and certain of them are useful as new anti-inflammatory agents, analgesics and central nervous system depressants.

27 Claims, No Drawings

PYRIDO(2,3-D) PYRIMIDINE-THIONES

DETAILED DESCRIPTION

The present invention relates to pyrido[2,3-d]pyrimidinethiones represented by the following formula I:

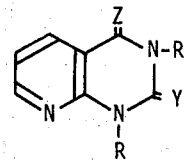

(I)

wherein R is selected from the group consisting of phenyl, substituted phenyl with one or two substituents which include halogens, lower alkyl, lower alkoxy and trifluoromethyl groups, benzyl, substituted benzyl with one or two substituents which include halogens, lower alkyl and lower alkoxy groups, and phenethyl; $R^1$ is selected from the group consisting of hydrogen, lower alkyl, unsaturated lower alkyl, substituted lower alkyl with halogen, hydroxy, lower alkoxy, lower alkanoyloxy, vinyloxy, hydroxy lower alkoxy or lower cycloalkyl, benzyl and phenethyl; Y and Z are selected from the group consisting of O and S, but Y and Z are always dissimilar. The compounds of the present invention possess remarkable pharmacological activities such as anti-inflammatory, anti-ulcerative, analgetic, antipyretic, antihistaminic and central nervous system depressive activities as well as low toxicity, and certain of them are useful as new analgesics, anti-inflammatory agents and central nervous system depressants. All of the compounds of the present invention possess at least one of said pharmacological activities, and most possess more than one of said activities.

More particularly, the present invention relates to the pyrido[2,3-d]pyrimidinethiones represented by the following formula:

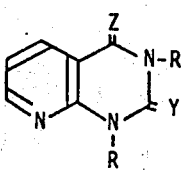

(I)

wherein R is selected from the group consisting of phenyl, halophenyl, dihalophenyl, tolyl and trifluoromethylphenyl; $R^1$ is selected from the group consisting of hydrogen, lower alkyl groups having from 1 to 6 carbon atoms, lower alkenyl groups having from 3 to 5 carbon atoms, propargyl, cyclopropylmethyl, lower haloalkyl groups having from 1 to 3 carbon atoms, lower trihaloalkyl groups having from 1 to 3 carbon atoms, vinyloxyethyl, acetoxyethyl, ethoxyethyl and lower hydroxyalkyl groups having from 2 to 3 carbon atoms; Y and Z are selected from the group consisting of O and S, but Y and Z are always dissimilar. The compounds of the present invention can be prepared in high yields by one of four basic routes, as will be described hereinafter.

PREPARATION 1

Reaction scheme [A]

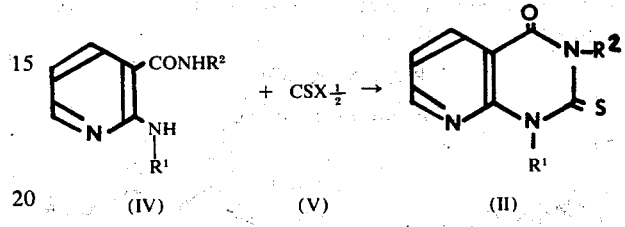

wherein $X^1$ is selected from the group consisting of halogen and imidazolyl; $R^1$ is selected from the group consisting of phenyl, halophenyl, dihalophenyl and trifluoromethylphenyl; $R^2$ is selected from the group consisting of lower alkyl, allyl, propargyl, cyclopropylmethyl, 2,2,2-trifluoroethyl, 2-acetoxyethyl and 2-ethoxyethyl. The reactions represented by the reaction scheme [A] are generally carried out in an inert solvent such as tetrahydrofuran, dimethylformamide, dioxane, diglyme, benzene, toluene, xylene or alcohol. In the preferred procedure the reaction is carried out in the presence of an alkali metal or metallic compound such as metallic sodium, metallic potassium, sodium hydride, sodium amide or sodium alcoholate, an organic base such as pyridine or trialkylamine, or an inorganic base such as alkali hydroxide or alkali carbonate. The first-mentioned alkali metals and metallic compounds are most effective to enhance the yield of product. The reaction temperature is preferably maintained under cooling with ice when thiophosgene is used as a reactant, and also maintained below the boiling point of the solvent used when 1,1'-thiocarbonyldiimidazole is used. The reaction solvent is distilled off from the reaction mixture under reduced pressure and the residue obtained is mixed with water to precipitate a crude product. Recrystallization of this product from an organic solvent such as acetone or methanol yields pure crystals.

PREPARATION 2

Reaction scheme [B]

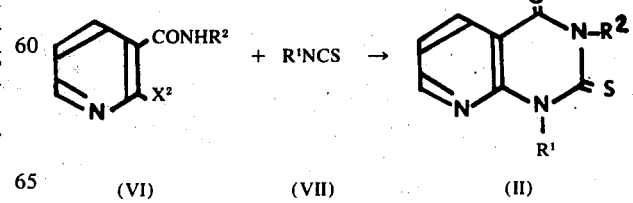

wherein $X^2$ is halogen; $R^1$ and $R^2$ have the same meaning as above. The reactions represented by the reaction scheme [B] are preferably carried out in such an organic solvent as tetrahydrofuran, diglyme, dichloromethane, benzene, toluene, xylene or dimethylformamide. These reactions should be processed in the presence of a metallic compund such as sodium hyride, sodium amide or sodium alcoholate. The reaction temperature is not critical, but the reaction proceeds smoothly near or at the boiling point of the solvent used. The reaction product can be purified either by recrystallization from an organic solvent such as methanol, ethanol, ethyl acetate or acetone, or by column chromatography to yield pure crystals.

PREPARATION 3

Reaction scheme [C]

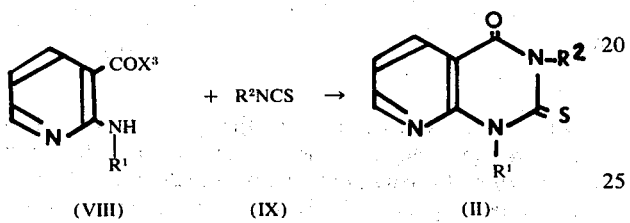

(VIII)    (IX)    (II)

wherein $X^3$ is selected from the group consisting of lower alkoxy and amino; $R^1$ and $R^2$ have the same meaning as above. The reactions represented by the reaction scheme [C] are generally carried out in an inert solvent such as tetrahydrofuran, dimethylformamide, dioxane, digylme, benzene, toluene, xylene or alcohol. In the preferred procedure these reactions should be carried out in the presence of an alkali metal or metallic compound such as metallic sodium, metallic potassium, sodium hydride, sodium amide or sodium alcoholate to obtain the high yield of the object compound.

PREPARATION 4

Reaction scheme [D]

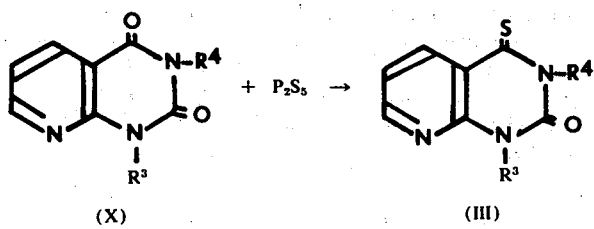

(X)    (III)

wherein $R^3$ is selected from the group consisting of phenyl, halophenyl, dihalophenyl, tolyl and trifluoromethylphenyl; $R^4$ is selected from the group consisting of hydrogen, lower alkyl, allyl and 2-hydroxyethyl.

The reaction represented by the reaction scheme [D] is carried out by heating the pyrido[2,3-d]pyrimidinedione with phosphorus pentasulfide either in or without an inert organic solvent. Pyridine, picoline, toluene, xylene or tetralin is utilized as the inert solvent. The reaction is preferably carried out at the elevated temperature ranging from 100°C to the boiling point of the solvent used. The pyrido[2,3-d]pyrimidinediones of the formula X, the starting materials used in the reaction scheme [D] in Preparation 4, can be prepared by the following reaction.

Reaction scheme [E]

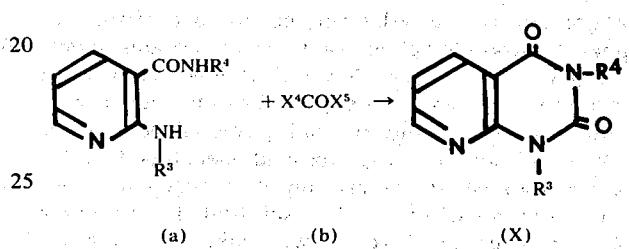

(a)    (b)    (X)

wherein $R^3$ and $R^4$ have the same meaning as above; $X^4$ and $X^5$ are the same or different and each represents halogen, lower alkoxy, imidazolyl or amino. The examples of the formula (b) include urea, methylurea, diethylurea, N-propylurethane, 1,1'-carbonyldiimidazole, phosgene, ethyl chlorocarbonate and diethyl carbonate.

COMPOUNDS

The object compounds of the present invention can be prepared by the process described in Preparation 1–4. The examples of the compounds and the melting points thereof are shown in Table I.

TABLE I

The Examples of the Compounds Obtained by the Present Invention

| Compound No. | Y | Z | R | R' | Melting Point (°C) |
|---|---|---|---|---|---|
| 1 | S | O | ⌬ | —CH₃ | 248 – 249 |
| 2 | " | " | " | —C₂H₅ | 211 – 212 |
| 3 | " | " | ⌬-F | —CH₃ | 222 – 224 |

-Continued

| Compound No. | Y | Z | R | R' | Melting Point (°C) |
|---|---|---|---|---|---|
| 4 | " | " | " | —C$_2$H$_5$ | 242 – 243 |
| 5 | " | " | phenyl-F | —CH$_3$ | 251 – 253 |
| 6 | " | " | " | —C$_2$H$_5$ | 198 – 200 |
| 7 | " | " | 2-Cl-phenyl | —C$_2$H$_5$ | 218 – 220 |
| 8 | " | " | 3-Cl-phenyl | —CH$_3$ | 249 – 250 |
| 9 | " | " | " | —C$_2$H$_5$ | 214 – 215 |
| 10 | " | " | " | —CH$_2$CH$_2$CH$_3$ | 212 – 213 |
| 11 | " | " | " | —CH$_2$CH=CH$_2$ | 252 – 253 |
| 12 | " | " | phenyl-Cl | —CH$_3$ | 240 – 241 |
| 13 | " | " | " | —C$_2$H$_5$ | 226 – 228 |
| 14 | S | O | 2-Br-phenyl | —CH$_3$ | 278 – 279 |
| 15 | " | " | " | —C$_2$H$_5$ | 182 – 183 |
| 16 | " | " | " | —CH$_2$CH$_2$CH$_3$ | 181 – 183 |
| 17 | " | " | " | —CH(CH$_3$)$_2$ | 190 – 191 |
| 18 | " | " | " | —CH$_2$CH=CH$_2$ | 227 – 228 |
| 19 | " | " | " | —CH$_2$C≡CH | 201 – 202 |
| 20 | " | " | " | —CH$_2$CF$_3$ | 192 – 194 |
| 21 | " | " | " | —CH$_2$-cyclopropyl | 195 – 197 |
| 22 | " | " | phenyl-Br | —C$_2$H$_5$ | 235 – 237 |
| 23 | " | " | 2-I-phenyl | —CH$_3$ | 292 – 294 |
| 24 | " | " | " | —C$_2$H$_5$ | 209 – 210 |
| 25 | " | " | " | —CH$_2$CH$_2$CH$_3$ | 200 – 201 |
| 26 | " | " | " | —CH$_2$CH$_2$OCH=CH$_2$ | 180 – 181 |
| 27 | " | " | 2-CF$_3$-phenyl | —CH$_3$ | 198 – 200 |
| 28 | " | " | " | —C$_2$H$_5$ | 158 – 159 |
| 29 | " | " | " | —CH$_2$CH=CH$_2$ | 173 – 174 |
| 30 | " | " | " | —CH$_2$CF$_3$ | 185 – 187 |
| 31 | S | O | " | —CH$_2$CH$_2$OCOCH$_3$ | 192 – 193 |
| 32 | " | " | 2-Cl-phenyl-Cl | —CH$_3$ | 249 – 250 |
| 33 | " | " | " | —C$_2$H$_5$ | 251 – 252 |
| 34 | " | " | " | —CH$_2$CH$_2$CH$_3$ | 207 – 208 |
| 35 | " | " | " | —CH$_2$C≡CH | 299 – 300 |
| 36 | " | " | " | —CH$_2$CH$_2$OC$_2$H$_5$ | 81 – 83 |
| 37 | O | S | phenyl | —H | 299 – 300 |
| 38 | " | " | " | —C$_2$H$_5$ | 182 – 183 |
| 39 | " | " | " | —CH$_2$CH$_2$CH$_3$ | 187 – 188 |
| 40 | " | " | 2-F-phenyl | —H | 245 – 247 |
| 41 | " | " | " | —C$_2$H$_5$ | 155 – 156 |
| 42 | " | " | 2-CF$_3$-phenyl | —H | 219 – 221 |
| 43 | " | " | " | —CH$_3$ | 224 – 225 |
| 44 | " | " | " | —C$_2$H$_5$ | 148 – 149 |
| 45 | " | " | " | —CH$_2$CH$_2$CH$_3$ | 162 – 163 |
| 46 | " | " | " | —CH(CH$_3$)$_2$ | 168 – 170 |
| 47 | " | " | " | —CH$_2$CH$_2$OH | 148 – 149 |
| 48 | O | S | 2-Cl-phenyl | —H | 252 – 253 |

-Continued

| Compound No. | Y | Z | R | R' | Melting Point (°C) |
|---|---|---|---|---|---|
| 49 | " | " | " | —CH₃ | 209 – 211 |
| 50 | " | " | ⟨C₆H₄⟩—Cl | —C₂H₅ | 235 – 236 |
| 51 | " | " | ⟨C₆H₄⟩—Br | —H | 248 – 249 |
| 52 | " | " | " | —C₂H₅ | 172 – 173 |
| 53 | " | " | " | —CH₂CH₂CH₃ | 180 – 182 |
| 54 | " | " | ⟨C₆H₄⟩—I | —H | 230 – 231 |
| 55 | " | " | " | —C₂H₅ | 203 – 205 |
| 56 | " | " | " | —CH₂CH₂CH₃ | 189 – 190 |
| 57 | " | " | " | —CH₂CH=CH₂ | 173 – 174 |
| 58 | " | " | ⟨C₆H₄⟩—CH₃ | —H | 237 – 238 |
| 59 | " | " | ⟨C₆H₂⟩(Cl)(Cl)—Cl | —H | 298 – 299 |
| 60 | " | " | " | —C₂H₅ | 180 – 182 |

TEST SERIES

With respect to numerous compounds of the present invention, the acute toxicity was tested to ensure their safety, and further central nervous system depressive, anti-inflammatory and analgetic effects were tested to prove their excellent activities. The results of each test are indicated in Table II. Each test was conducted in the following manner.

1. Acute toxicity

Each test compound suspended in 0.5 % tragacanth-saline solution was administered intraperitoneally or orally to dd-strain male mice (16–24 g). The lethal dose was estimated from the death of animals 72 hours after administration.

2. Anti-inflammatory effect

A group of five Wistar-strain male rats (100–150 g) were orally administered with each test compound suspended in 0.5 % tragacanth-saline solution. After 30 minutes 0.5–1.0 % carrageenin suspended in the water for injection was injected subcutaneously to a hind paw. After 3 hours the carrageenin edema was measured by volume and the inhibition percentage was determined with respect to the results for the control animals. The inhibition percentages were sown with the notations as follows:

less than 15 % : ±      31–45 % : ++      more than 61 % : ++++
16–30 % : +             46–60 % : +++

3. Analgetic Effect

Each test compound suspended in 0.5 % tragacanth-saline solution was orally administered to dd-strain male mice (18–20 g). After 1 hour 0.6 % acetic acid solution was intraperitoneally injected in a volume of 0.1 ml/10 g. The writhing syndrome was observed for 10 minutes from 30 minutes after the injection, and 50 % analgetic effective dose ($ED_{50}$) and its 95 % confidential limits were calculated by Litchfield-Wilcoxon's method.

4. Central nervous system depressive effect

Each test compound suspended in 0.5 % tragacanth-saline solution was injected intraperitoneally to dd-strain male mice (16–24 g). The disappearance of righting reflex was observed under noiseless circumstances. The dose required for the disappearance of righting reflex is indicated with the following notations:

more than 1,000 (mg/kg) : —
1,000–300 (mg/kg) : ±
300–100 (mg/kg) : +
100–30 (mg/kg) : ++
30–10 (mg/kg) : +++
less than 10 (mg/kg) : ++++

TABLE II

Anti-inflammatory, Analgetic and Central Nervous System Depressive Effects, and Acute Toxicity of the Object Compounds of General Formula

| Standard | anti-inflammatory effect dose(mg/kg) 50 | | analgetic effect $ED_{50}$ (95%C.L.) (mg/kg) | C N S depressive effect | acute toxicity (mg/kg) i.p. |
|---|---|---|---|---|---|
| | 50 | 10 | | | |
| phenylbutazone | ++ | ± | 290 (113–435) | ± | 300–1000 |
| flufenamic acid | + | ± | 180 (131–245) | — | 300–1000 |
| aminopyrine | ± | ± | i.p. 56.0 (43.0–73.0) | / | 100–300 |
| methaqualone | / | / | / | +++ | 300–1000 |
| diazepam | + | ± | / | ++ | 300–1000 |

| Y | Z | R | R' | anti-inflammatory effect dose(mg/kg) 50 | 10 | analgetic effect $ED_{50}$ (95%C.L.) (mg/kg) | C N S depressive effect | acute toxicity (mg/kg) i.p. | p.o. |
|---|---|---|---|---|---|---|---|---|---|
| S | O | phenyl | —CH₃ | + | + | 100 | + | >1000 | 2000 |
| " | " | " | —C₂H₅ | ++ | + | 22.8 (9.50–54.7) | + | >1000 | / |
| " | " | 2-F-phenyl | —CH₃ | + | ± | 17.0 (6.61–43.7) | — | >1000 | >2000 |
| " | " | " | —C₂H₅ | ++ | + | 24.0 (8.08–71.3) | — | >1000 | >2000 |
| " | " | 4-F-phenyl | —CH₃ | +++ | +++ | ≧ 100 | ± | >1000 | 1000–2000 |
| " | " | " | —C₂H₅ | ++++ | +++ | 28.5 (10.5–77.5) | + | 1000 | / |
| " | " | 2-Cl-phenyl | —CH₃ | ± | + | 25.5 (11.1–58.4) | / | / | / |
| " | " | " | —C₂H₅ | ++ | ++ | 20.5 (8.67–50.8) | ++ | >1000 | / |
| " | " | 4-Cl-phenyl | —CH₃ | + | + | >100 | / | / | / |
| " | " | " | —C₂H₅ | ++ | ++ | >100 | — | >1000 | >2000 |
| " | " | 2-Br-phenyl | —CH₃ | + | + | 100 | / | / | / |
| " | " | " | —C₂H₅ | ++ | ++ | 16.5 (6.47–42.1) | + | 1000 | >2000 |
| " | " | " | —CH₂CH=CH₂ | + | — | >100 | ± | >1000 | / |
| " | " | " | —CH₂C≡CH | ± | / | >100 | / | / | / |
| " | " | 2-I-phenyl | —C₂H₅ | +++ | + | 23.0 (9.20–57.5) | | | |
| " | " | 2-CF₃-phenyl | —CH₃ | ++ | ± | 100 | + | ≧ 1000 | 2000 |
| " | " | " | —C₂H₅ | ++++ | +++ | 21.0 (9.40–46.8) | ++ | 1000 | 1000 |
| " | " | 2,4-Cl₂-phenyl | —CH₃ | + | + | 100 | — | >1000 | >2000 |

—Continued

| Standard | anti-inflammatory effect dose(mg/kg) 50 | 10 | analgetic effect ED$_{50}$ (95%C.L.) (mg/kg) | CNS depressive effect | acute toxicity (mg/kg) i.p. |
|---|---|---|---|---|---|

Structure: pyrido[2,3-d]pyrimidine with substituents Z, N-R, Y, N-R

| Y | Z | R | R' | anti-inflammatory effect dose(mg/kg) 50 | 10 | analgetic effect ED$_{50}$ (95%C.L.) (mg/kg) | CNS depressive effect | acute toxicity (mg/kg) i.p. | p.o. |
|---|---|---|---|---|---|---|---|---|---|
| " | " | " | —C$_2$H$_5$ | ++ | ++ | 56.0 (20.0–156.8) | — | >1000 | >2000 |
| " | " | " | —CH$_2$CH$_2$CH$_3$ | + | / | ≧100 | / | / | / |
| O | S | phenyl | —CH$_3$ | +++ | +++ | 100 | ++ | 300–1000 | 200–500 |
| " | " | " | —C$_2$H$_5$ | ++++ | + | 18.0 (7.26–44.6) | ++++ | 100–300 | 200–500 |
| " | " | phenyl-F | —C$_2$H$_5$ | ++++ | + | 27.0 (10.9–67.0) | ++++ | 100–300 | 200–500 |
| " | " | phenyl-Cl | —CH$_3$ | +++ | +++ | 28.5 (12.7–64.1) | +++ | 1000 | >2000 |
| " | " | " | —C$_2$H$_5$ | + | + | 15.0 (6.36–35.4) | +++ | 300–1000 | 500–1000 |
| " | " | phenyl-Cl (para) | —C$_2$H$_5$ | +++ | + | ≧100 | + | >1000 | / |
| " | " | phenyl-Br | —CH$_3$ | +++ | ++ | >100 | +++ | >1000 | / |
| " | " | " | —C$_2$H$_5$ | +++ | + | 19.5 (8.37–45.4) | +++ | 300–1000 | >2000 |
| " | " | phenyl-I | —CH$_3$ | ± | / | >100 | — | >1000 | / |
| " | " | " | —C$_2$H$_5$ | ++ | + | 26.5 (9.30–75.5) | + | >1000 | / |
| " | " | phenyl-CF$_3$ | —H | / | ± | ≧100 | / | / | / |
| " | " | " | —CH$_3$ | ++ | — | 100 | — | >1000 | / |
| " | " | " | —C$_2$H$_5$ | ++ | +++ | 17.5 (6.94–44.1) | + | 300–1000 | 1000–2000 |
| " | " | " | —CH$_2$CH$_2$OH | + | + | 15.3 (6.70–34.9) | +++ | 1000 | 1000–2000 |
| " | " | phenyl-Cl,Cl | —C$_2$H$_5$ | +++ | +++ | 25.0 (9.06–69.0) | ++ | 300–1000 | >2000 |

Examples of the present invention are shown in the following.

EXAMPLE 1

To a solution of 3.2 g of 2-(m-bromoanilino)nicotinethylamide and 50 ml of tetrahydrofuran was added 1.1 g of 50 % sodium hydride and the mixture was stirred for 15 minutes at room temperature. To the mixture was added dropwise under ice-cooling 3.45 g of thiophosgene which was diluted with a small amount of tetrahydrofuran. The mixture was stirred for 30 minutes at room temperature and then the excess of thiophosgene was decomposed with ammonia-saturated methanol solution under ice-cooling. Then the solvent was distilled off from the reaction mixture to leave the residue, to which was added water to give a crude product. Recrystallization of this product from methanol gave 3.2 g of 1-(m-bromophenyl)-3-ethyl-2-thio-4-oxo-1,2,3,4-tetrahydropyrido[2,3-d]pyrimidine as colorless needles, melting point at 182°–183°C. Analysis-Calculated for C$_{15}$H$_{12}$BrN$_3$OS : C:49.74, H:3.34, N:11.60. Found : C:49.78, H:3.31, N:11.59.

EXAMPLE 2

To a solution of 3.1 g of 2-(m-trifluoromethylanilino)nicotinethylamide in 50 ml of tetrahydrofuran was added 1 g of 50 % sodium hydride and stirring was continued for 15 minutes. To the mixture was further added 5.7 g of 1,1'-thiocarbonyldiimidazole and the whole was stirred for 1 hour at room temperature and then refluxed for 5 hours. After the reaction was finished, the solvent was evaporated from the mixture to leave the residue, to which was added water to precipitate a crude product. Recrystallization of this product from methanol gave 2.4 g of 1-(m-trifluoromethylphenyl)-3-ethyl-2-thio-4-oxo-1,2,3,4-tetrahydropyrido[2,3-d]pyrimidine as colorless prisms, melting at 158°–159°C. Analysis-Calculated for $C_{16}H_{12}F_3N_3OS$ : C:54.70, H:3.44, N:11.96. Found : C:54.69, H:3.48, N:12.01.

EXAMPLE 3

To a mixture of 1.8 g of 2-chloronicotinethylamide and 20 ml of dry dimethlformamide was added 1.0 g of 50 % sodium hydride and stirring was continued for 30 minutes at room temperature. To this was further added 1.6 g of phenylisothiocyanate and the mixture was refluxed for 3 hours, and then the solvent was distilled off under reduced pressure. The residue thus obtained was dissolved in a small amount of chloroform and the chloroform solution was chromatographed on a column of silica gel and the product was then eluted with chloroform. The eluate was evaporated to dryness and the combined product was recrystallized from methanol to yield 2.0 g of 1-phenyl-3-ethyl-2-thio-4-oxo-1,2,3,4-tetrahydropyrido[2,3-d]pyrimidine as pale yellow prisms, melting at 211°–212°C. Analysis-Calculated for $C_{15}H_{13}N_3OS$ : C:63.58, H:4.62, N:14.83. Found : C:63.63, H:4.57, N:14.77.

EXAMPLE 4

To a solution of 2.0 g of 2-chloronicotinisopropylamide and 20 ml of dry dimethylformamide was added 1.0 g of 50 % sodium hydride and the mixture was stirred for 30 minutes at room temperature. To this was further added 2.8 g of m-bromophenylisothiocyanate and the mixture was refluxed for 4 hours. The solvent was distilled off from the reaction mixture under reduced pressure. The residue thus obtained was chromatographed on a silica gel column and the product was eluted with chloroform. The eluate was evaporated to dryness and the combined product was recrystallized from acetone to give 2.6 g of 1-(m-bromophenyl)-3-isopropyl-2-thio-4-oxo-1,2,3,4-tetrahydropyrido[2,3-d]pyrimidine as colorless prisms, melting at 190°–191°C. Analysis-Calculated for $C_{16}H_{14}BrN_3OS$ : C:51.07, H:3.75, N:11.17. Found : C:51.12, H:3.71, N:11.09.

EXAMPLE 5

To a solution of 2.8 g of 2-(m-chloroanilino)nicotinic acid ethyl ester and 25 ml of dry tetrahydrofuran was added 0.6 g of sodium hydride and the mixture was stirred for 30 minutes. To this was further added 1.1 g of ethylisothiocyanate and the mixture was refluxed for 3 hours. After the reaction was completed, the mixture was concentrated under reduced pressure and the residue was chromatographed on a column of silica gel. The product was eluted with chloroform and the eluate was evaporated to dryness. The combined product was recrystallized from methanol to give 1.9 g of 1-(m-chlorophenyl)-3-ethyl-2-thio-4-oxo-1,2,3,4-tetrahydropyrido[2,3-d]pyrimidine as colorless prisms, melting at 214°–215°C. Analysis-Calculated for $C_{15}H_{12}ClN_3OS$ : C:56.69, H:3.81, N:13.22. Found : C:56.65, H:3.83, N:13.18.

EXAMPLE 6

To a solution of 3.1 g of 2-(m-trifluoromethylanilino)nicotinic acid ethyl ester and 25 ml of dry tetrahydrofuran was added 0.47 g of sodium amide and stirring of the mixture was continued for 1 hour at room temperature. To this was further added 0.9 g of methylisothiocyanate and the mixture was refluxed for 5 hours. After the reaction was completed, the mixture was concentrated under reduced pressure and the residue was chromatographed on a column of silica gel. The product was eluted with chloroform and the eluate was evaporated to dryness. The combined product was recrystallized from methanol to yield 2.1 g of 1-(m-trifluoromethylphenyl)3-methyl-2-thio-4-oxo-1,2,3,4-tetrahydropyrido[2,3-d]pyrimidine as pale yellow prisms, melting at 198°–200°C. Analysis-Calculated for $C_{15}H_{10}F_3N_3OS$ : C:53.41, l H:2.99, N:12.46. Found : C:53.38, H:3.04, N:12.41.

EXAMPLE 7

A mixture of 1.54 g of 1-(3,4-dichlorophenyl)-2,4-dioxo-1,2,3,4-tetrahydropyrido[2,3-d]pyrimidine, 1.7 g of phosphorus pentasulfide and 20 ml of pyridine was refluxed for 8 hours. After the reaction was over, pyridine was distilled off from the mixture under reduced pressure and to the residue was added water. This solution was allowed to stand overnight at room temperature to yield the precipitate which was then separated by filtration. Recrystallization of this product from acetone gave 1.47 g of 1-(3,4-dichlorophenyl)-2-oxo-4-thio-1,2,3,4-tetrahydropyrido[2,3-d]pyrimidine as pale yellow needles, melting at 298°–299°C. Analysis-Calculated for $C_{13}H_7Cl_2N_3OS$ : C:48.16, H:2.19, N:12.96. Found: C:48.21, H:2.02, N:12.82.

EXAMPLE 8

A mixture of 1.43 g of 1-(m-fluorophenyl)-3-ethyl-2,4-dioxo-1,2,3,4-tetrahydropyrido[2,3-d]pyrimidine, 1.7 g of phosphorus pentasulfide and 30 ml of xylene was refluxed for 3 hours. Xylene was distilled off from the mixture under reduced pressure to leave the residue, to which was added water. The solution was extracted with three 30 ml portions of chloroform. The chloroform layer was washed with water, dehydrated and evaporated to remove the solvent. The residual solid obtained was recrystallized with ether to yield 1.23 g of 1-(m-fluorophenyl)-3-ethyl-2-oxo-4-thio-1,2,3,4-tetrahydropyrido[2,3-d]pyrimidine as yellow needles, melting at 155°–156°C. Analysis-Calculated for $C_{15}H_{12}FN_3OS$ : C:59.78, H:4.01, N:13.94. Found : C:59.62, H:3.98, N:13.82.

EXAMPLE 9

A mixture of 1.8 g of 1-(m-bromophenyl)-3-propyl-2,4-dioxo-1,2,3,4-tetrahydropyrido[2,3-d]pyrimidine, 1.7 g of phosphorus pentasulfide and 30 ml of xylene was refluxed for 2 hours. Xylene was evaporated under reduced pressure from the mixture to leave the residue, to which was added water. The solution was extracted with three 30 ml portions of chloroform. The chloroform layer was washed with water, dehydrated and evaporated under reduced pressure to remove the solvent. The residual solid was recrystallized from acetone to give 1.68 g of 1-(m-bromophenyl)-3-propyl-2-oxo-4-thio-1,2,3,4-tetrahydropyrido[2,3-d]pyrimidine as pale yellow needles, melting at 180°–182°C. Analysis- Calculated for $C_{16}H_{14}BrN_3OS$ : C:51.07, H:3.75, N:11.16. Found : C:51.12, H:3.82, N:11.18.

What is claimed is:

1. A compound of the formula

wherein R is selected from the group consisting of phenyl, halophenyl, dihalophenyl, tolyl and trifluoromethylphenyl ; $R^1$ is selected from the group consisting of hydrogen, lower alkyl having from 1 to 6 carbon atoms, lower alkenyl having from 3 to 5 carbon atoms, propargyl, cyclopropylmethyl, trihaloalkyl having from 1 to 3 carbon atoms, vinyloxyethyl, acetoxyethyl, ethoxyethyl and lower hydroxyalkyl having from 2 to 3 carbon atoms ; Y and Z are selected from the group consisting of O and S, but Y and Z are always dissimilar.

2. A compound in accordance with claim 1 of the formula:

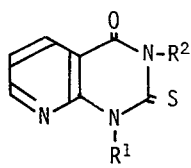

wherein $R^1$ is selected from the group consisting of phenyl, halophenyl, dihalophenyl and trifluoromethylphenyl ; $R^2$ is selected from the group consisting of lower alkyl having from one to 6 carbon atoms, allyl, propargyl, cyclopropylmethyl, 2,2,2-trifluoroethyl, 2-acetoxyethyl and 2-ethoxyethyl.

3. A compound in accordance with claim 1 of the formula:

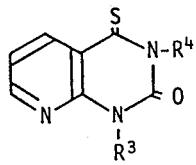

wherein $R^3$ is selected from the group consisting of phenyl, halophenyl, dihalophenyl, tolyl and trifluoromethylphenyl ; $R^4$ is selected from the group consisting of lower alkyl having from one to 6 carbon atoms, allyl and 2-hydroxyethyl.

4. A compound in accordance with claim 1 which is: 1-phenyl-3-ethyl-2-thio-4-oxo-1,2,3,4-tetrahydropyrido[2,3-d]pyrimidine.

5. A compound in accordance with claim 1 which is: 1-(m-fluorophenyl)-3-methyl-2-thio-4-oxo-1,2,3,4,-tetrahydropyrido[2,3-d]pyrimidine.

6. A compound in accordance with claim 1 which is: 1-(m-fluorophenyl)-3-ethyl-2-thio-4-oxo-1,2,3,4-tetrahydropyrido[2,3-d]pyrimidine.

7. A compound in accordance with claim 1 which is: 1-(p-fluorophenyl)-3-methyl-2-thio-4-oxo-1,2,3,4-tetrahydropyrido[2,3-d]pyrimidine.

8. A compound in accordance with claim 1 which is: 1-(p-fluorophenyl)-3-ethyl-2-thio-4-oxo-1,2,3,4-tetrahydropyrido[2,3-d]pyrimidine.

9. A compound in accordance with claim 1 which is: 1-(m-chlorophenyl)-3-methyl-2-thio-4-oxo-1,2,3,4-tetrahydropyrido[2,3-d]pyrimidine.

10. A compound in accordance with claim 1 which is: 1-(m-chlorophenyl)-3-ethyl-2-thio-4-oxo-1,2,3,4-tetrahydropyrido[2,3-d]pyrimidine.

11. A compound in accordance with claim 1 which is: 1-(m-bromophenyl)-3-ethyl-2-thio-4-oxo-1,2,3,4-tetrahydropyrido[2,3-d]pyrimidine.

12. A compound in accordance with claim 1 which is: 1-(m-iodophenyl)-3-ethyl-2-thio-4-oxo-1,2,3,4-tetrahydropyrido[2,3-d]pyrimidine.

13. A compound in accordance with claim 1 which is: 1-(m-trifluoromethylphenyl)-3-ethyl-2-thio-4-oxo-1,2,3,4-tetrahydropyrido[2,3-d]pyrimidine.

14. A compound in accordance with claim 1 which is: 1-(3,4-dichlorophenyl)-3-ethyl-2-thio-4-oxo-1,2,3,4,-tetrahydropyrido[2,3-d]pyrimidine.

15. A compound in accordance with claim 1 which is: 1-phenyl-3-methyl-2-oxo-4-thio-1,2,3,4-tetrahydropyrido[2,3-d]pyrimidine.

16. A compound in accordance with claim 1 which is: 1-phenyl-3-ethyl-2-oxo-4-thio-1,2,3,4-tetrahydropyrido[2,3-d]pyrimidine.

17. A compound in accordance with claim 1 which is: 1-(m-fluorophenyl)-3-ethyl-2-oxo-4-thio-1,2,3,4-tetrahydropyrido[2,3-d]pyrimidine.

18. A compound in accordance with claim 1 which is: 1-(m-chlorophenyl)-3-methyl-2-Oxo-4-thio-1,2,3,4-tetrahydropyrido[2,3-d]pyrimidine.

19. A compound in accordance with claim 1 which is: 1-(m-chlorophenyl)-3-ethyl-2-oxo-4-thio-1,2,3,4-tetrahydropyrido[2,3-d]pyrimidine.

20. A compound in accordance with claim 1 which is: 1-(p-chlorophenyl)-3-ethyl-2-oxo-4-thio-1,2,3,4-tetrahydropyrido[2,3-d]pyrimidine.

21. A compound in accordance with claim 1 which is: 1-(m-bromophenyl)-3-methyl-2-oxo-4-thio-1,2,3,4-tetrahydropyrido[2,3-d]pyrimidine.

22. A compound in accordance with claim 1 which is: 1-(m-bromphenyl)-3-ethyl-2-oxo-4-thio-1,2,3,4-tetrahydropyrido[2,3-d]pyrimidine.

23. A compound in accordance with claim 1 which is: 1-(m-iodophenyl)-3-ethyl-2-oxo-4-thio-1,2,3,4-tetrahydropyrido[2,3-d]pyrimidine.

24. A compound in accordance with claim 1 which is:

1-(m-trifluoromethylphenyl)-3-ethyl-2-oxo-4-thio-1,2,3,4-tetrahydropyrido[2,3-d]pyrimidine.

25. A compound in accordance with claim 1 which is:

1-(m-trifluoromethylphenyl)-3-(2-hydroxyethyl)-2-oxo-4-thio-1,2,3,4-tetrahydropyrido[2,3-d]pyrimidine.

26. A compound in accordance with claim 1 which is:

1-(3,4-dichlorophenyl)-3-ethyl-2-oxo-4-thio-1,2,3,4-tetrahydropyrido[2,3-d]pyrimidine.

27. A compound in accordance with claim 1 which is:

1-(3,4-dichlorophenyl)-3-ethyl-2-oxo-4-thio-1,2,3,4,-tetrahydropyrido[2,3-d]pyrimidine.

* * * * *

UNITED STATES PATENT OFFICE
CERTIFICATE OF CORRECTION

PATENT NO. : 3,912,736
DATED : October 14, 1975
INVENTOR(S) : Kanji NODA et al

It is certified that error appears in the above-identified patent and that said Letters Patent are hereby corrected as shown below:

The formula appearing in the Abstract, in Column 1, lines 10 and 50, Column 4 (Table I), and Columns 9, 10 and 11, should read as follows:

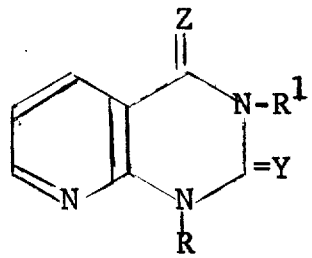

The formula in Column 2, line 15, should read as follows:

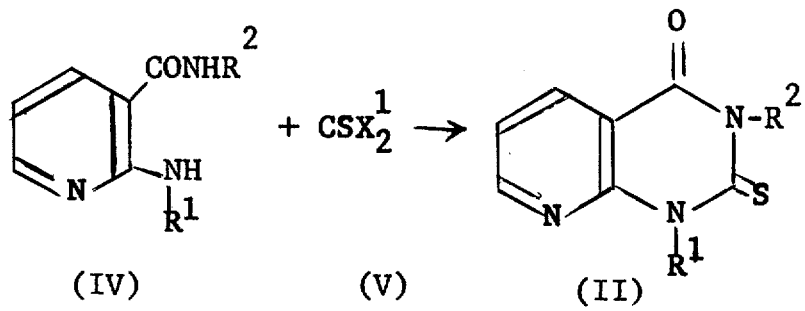

Signed and Sealed this sixteenth Day of March 1976

[SEAL]

Attest:

RUTH C. MASON
Attesting Officer

C. MARSHALL DANN
Commissioner of Patents and Trademarks